Figure 1:
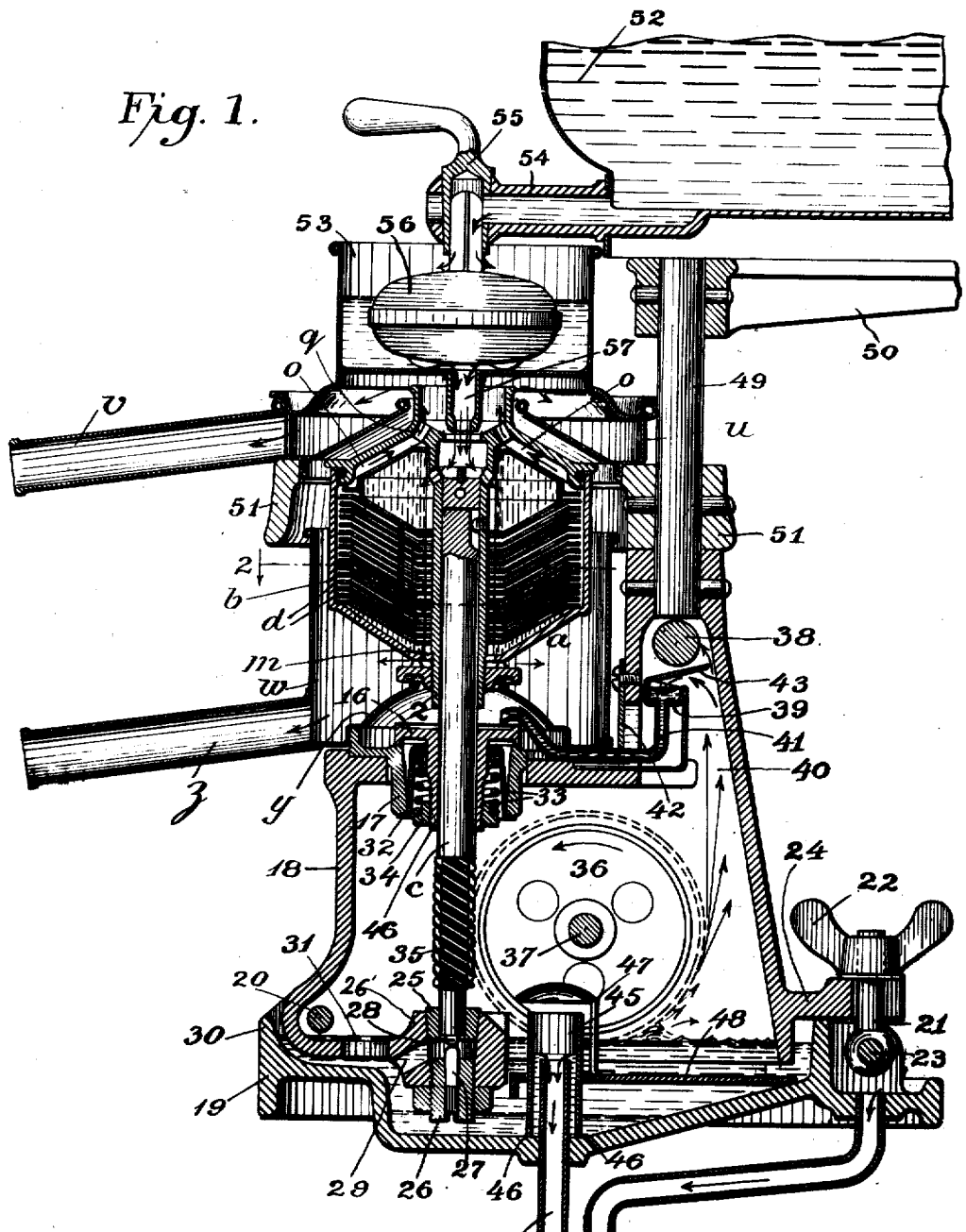

S. C. ANKER-HOLTH.
CREAM SEPARATOR.
APPLICATION FILED APR. 29, 1908.

1,006,174.

Patented Oct. 17, 1911.
4 SHEETS—SHEET 1.

WITNESSES:

INVENTOR.

ATTORNEY.

S. C. ANKER-HOLTH.
CREAM SEPARATOR.
APPLICATION FILED APR. 29, 1908.

1,006,174.

Patented Oct. 17, 1911.
4 SHEETS—SHEET 2.

WITNESSES:
Rufus Cope
Pauline Upchurch

INVENTOR.
Severin C. Anker-Holth
BY
Harry J. Cromer
ATTORNEY.

S. C. ANKER-HOLTH.
CREAM SEPARATOR.
APPLICATION FILED APR. 29, 1908.
1,006,174.
Patented Oct. 17, 1911.
4 SHEETS—SHEET 3.
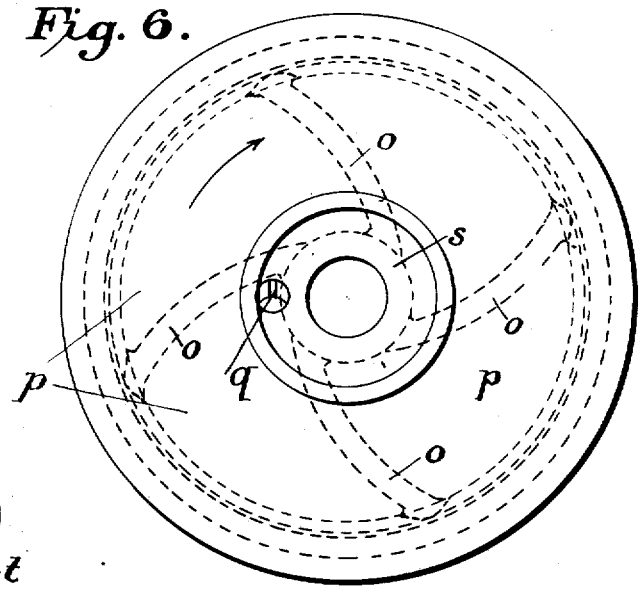
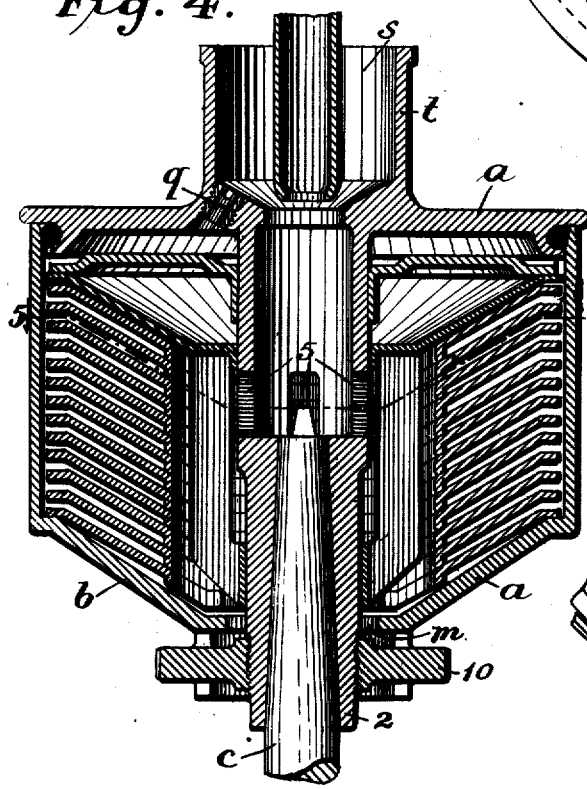
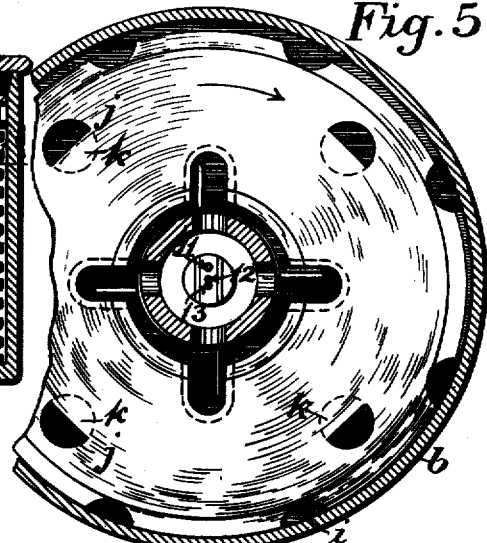
WITNESSES:
INVENTOR.
BY
ATTORNEY.

S. C. ANKER-HOLTH.
CREAM SEPARATOR.
APPLICATION FILED APR. 29, 1908.
1,006,174.
Patented Oct. 17, 1911.
4 SHEETS—SHEET 4.
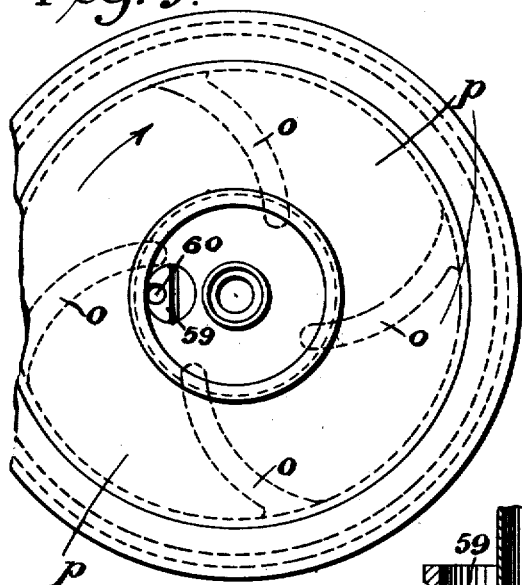
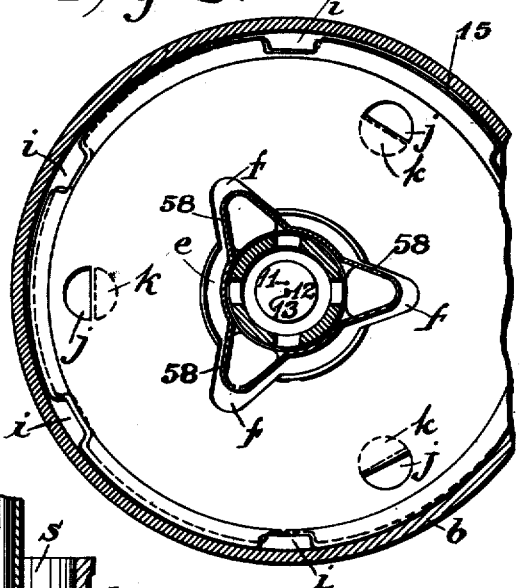
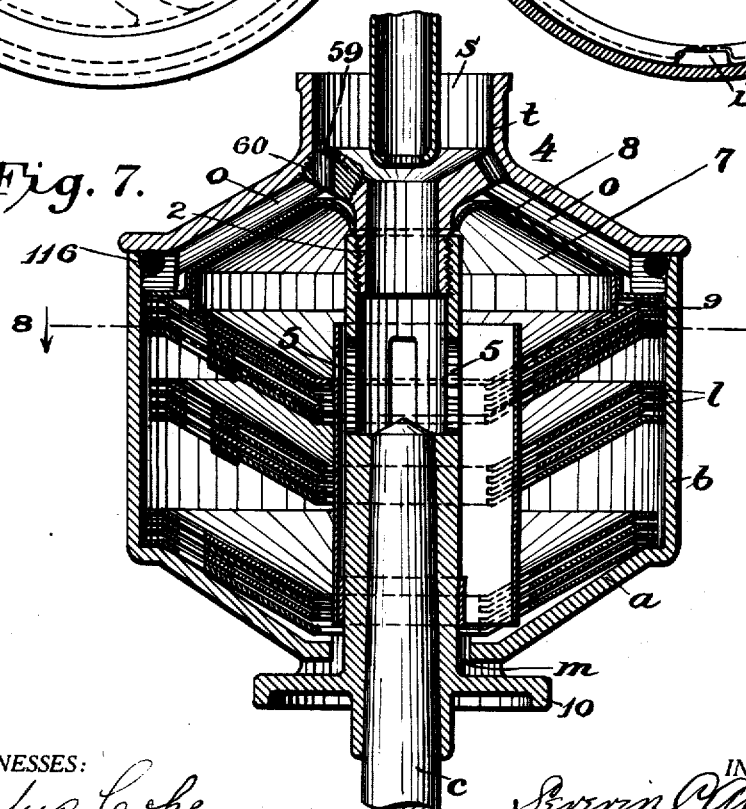

UNITED STATES PATENT OFFICE.

SEVERIN C. ANKER-HOLTH, OF RIVERSIDE, ILLINOIS.

CREAM-SEPARATOR.

1,006,174.     Specification of Letters Patent.     Patented Oct. 17, 1911.

Application filed April 29, 1908. Serial No. 429,923.

*To all whom it may concern:*

Be it known that I, SEVERIN C. ANKER-HOLTH, a citizen of the United States, residing in Riverside, in the county of Cook and State of Illinois, have invented certain new and useful Improvements in Cream-Separators, of which the following is a specification.

This invention relates to that class of cream separators or centrifugal machines having a rotary bowl provided with disks or similar elements, or adapted to be used for separating cream or butter fat from milk, or the lighter from the relatively heavy portions of material to be operated upon or treated.

The principal object of the invention is to provide a simple, economical and efficient cream separator.

A further object is to provide a cream separator with a bowl and disks, or centrifugal separator mechanism adapted to be balanced in an efficient manner by the adjustment or movement of the disks and bowl shell with relation to each other, thereby dispensing with the necessity of using a counterbalance, enabling the disks to be removed and replaced in any desired order and without being numbered or keyed, or always replaced in the same relative positions, reducing the cost of construction by dispensing with the necessity for "balancing" the bowl by adding weight or metal to or removing it from parts of the bowl for that purpose, and enabling the disks and bowls respectively to be used interchangeably.

A further object of the invention is to provide a centrifugal separator comprising an outer receptacle or bowl shell, and inner separator or disk members inside of and in movable relation to the outer rotary receptacle or bowl shell and adapted to be rotated thereby and in synchronism therewith about a shifting, movable, revolving, or gyratory axis or center of rotation while said inner members and receptacle are in movable relation to each other and to the axis or center of rotation so as to utilize the outward individual centrifugal or outward movements and tendencies of each of said relatively movable members to counteract and limit those of the others and cause all of said parts to be moved with relation to each other and with relation to the axis of rotation to balanced position with the bowl shell and the chamber formed thereby concentric with the axis of rotation of the bowl, and said axis of rotation, the geometrical center of the bowl shell, and the center of gravity of the bowl all in such position that they coincide with each other.

A further object of the invention is to provide a centrifugal separator adapted to enable the cream to be separated from milk, by first causing the milk, or material to be treated, to flow through preferably all of the disks between walls, or in the laterally closed channels encircled by the disks, in a direction substantially parallel to the axes of the disks, thereby separating the largest and lightest particles of the material or cream from the main body of the material and discharging the same, and then subjecting the said main or remaining portion of the material to the action of preferably all of the disks by causing the lighter particles or cream to be forced inward through the spaces between the disks and out through the cream outlet below the disks, and the relatively heavy particles or skimmed milk to be forced outward and preferably upward and finally inward to and out through the skimmed milk outlet above the disks. By this means the milk supply reservoir is enabled to be placed lower than would be possible if the cream outlet were above the level of the disks and below the level of the skimmed milk outlet. The bowl is readily drained or "self-draining" and capable of being efficiently cleansed with a minimum quantity of water, and is adapted to cause all cream contained in the bowl when stopped or when its speed is slackened to pass out through the cream outlet so as to be saved. The disks are interchangeable. The rotary receptacles or bowl shells of different machines or separators of the same size and type are interchangeable and are adapted to be used with corresponding disks or sets of disks, or with machine frames, and spindles, or in other words, interchangeably, without the necessity of fitting the receptacle to a particular spindle or frame or set of disks, etc., all of which will be understood to be of great advantage.

Further objects of the invention are to provide a separator which is adapted to be operated with the minimum expenditure of power; to provide means for enabling all of the bearings to be lubricated constantly and in an efficient manner from a single oil reservoir; to provide means for enabling the liquid to facilitate the rotation of the bowl by restoring a portion of the power or energy expended in setting it in motion.

Other and further objects of the invention will appear from an examination of the drawings and the following description and claims.

The invention consists principally in a centrifugal separator comprising an outer receptacle bowl shell, or drum having detached inner separator members or disks inside of and in movable relation to the outer receptacle, and adapted to be so balanced that the geometrical center of the bowl shell and the axis of rotation of the bowl coincide, such balancing being accomplished by rotating the series of disks by and in unison or synchronously with the outer receptacle while said disks are in movable relation to and in contact with a concentric surface of the bowl shell which is circular and in fixed relation to the bowl shell and adapted to positively limit the outward movement and counteract the outward or lateral tendencies of the disks with respect to the bowl shell, the disks and receptacle being thus adapted to simultaneously press outward in different directions and to resist, limit and counteract the outward tendency or pressure of each other.

It consists further in the machine, or separator, and in the features, combinations, and details of construction herein described and claimed.

Figure 2:
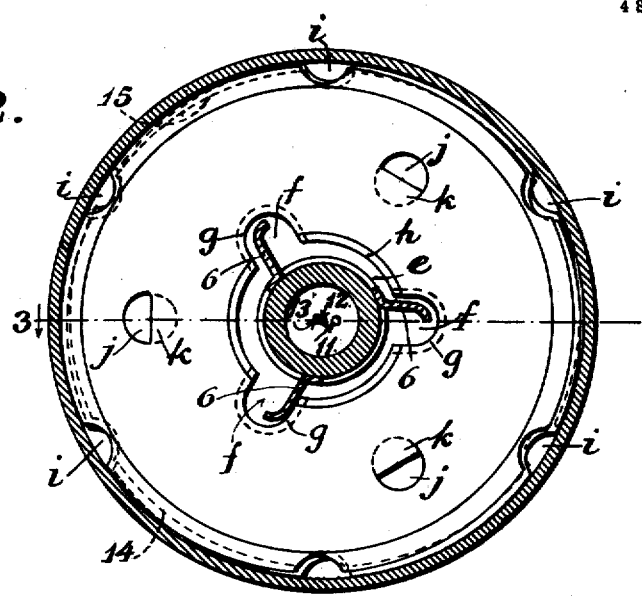
Figure 3:
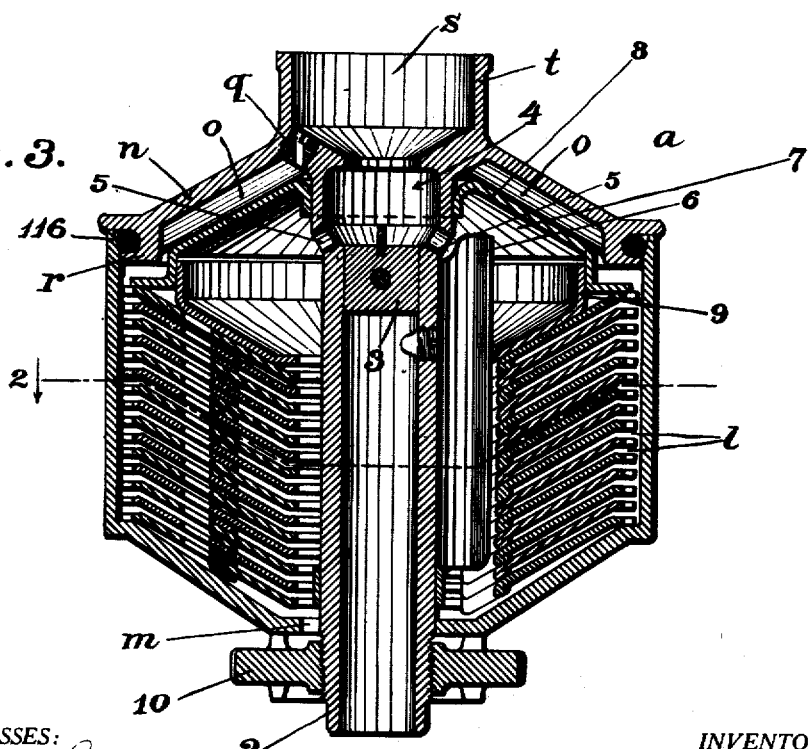

In the accompanying drawings, Figure 1 is a view in vertical section through the center of a cream separator or centrifugal machine constructed in accordance with my improvements and adapted to be used in the practice of the process or method herein described; Fig. 2, an enlarged detail view in horizontal section, taken on line 2 of Fig. 1, looking downward and showing the rotary receptacle or bowl shell and disk mechanism in full lines, and indicating the position of certain disks when in balanced position, by broken lines; Fig. 3, an enlarged central sectional view in elevation of the receptacle and disk mechanism shown in Figs. 1 and 2; Fig. 4, a view in central sectional elevation of a modified form of centrifugal separator, or receptacle and disk mechanism; Fig. 5, a horizontal sectional view of the mechanism shown in Fig. 4, taken on line 5 of said figure; Fig. 6, a top or plan view of a bowl cap or cover, showing radial curved depending ribs adapted to be engaged by the outflowing liquid or skimmed milk; Fig. 7, a view in central sectional elevation of a centrifugal separator or bowl shell, showing a modified form of hollow shaft or walls for forming laterally closed channels or passages through and parallel with the axial center of the receptacle and through the centrally perforated disks, with some of the disks omitted, the disks being in contact with the receptacle on opposite sides of its axial center, as they would be in balanced position; Fig. 8, a horizontal sectional view taken on line 8 of Fig. 7, looking in the direction of the arrow; and Fig. 9, a plan view of the cover shown in Fig. 7.

In constructing a cream separator or centrifugal machine in accordance with my improvements and having a rotary centrifugal separator or bowl, or receptacle and inner disk members adapted to be balanced in the manner described, or adapted to be constantly movable to the required positions with relation to each other to balanced position, I provide a centrifugal separator or bowl $a$, consisting of or comprising a rotary outer bowl shell or rotary casing $b$, mounted upon and preferably in fixed relation to a preferably vertical shaft or spindle $c$, and comprising a central hollow shaft or core 2, which forms part of the bowl shell. The bowl is provided with a series of dished separator members, disks, plates, or inner bowl members $d$ mounted upon the inside of and in movable relation to the bowl shell, and having a space between their peripheral edges and the inner periphery or face of the bowl shell except at the point or points where the disks are forced outward into engagement with the bowl shell or casing by the action of centrifugal force generated by the rotation of the bowl shell and disks.

The tapered, conoidal or dished separator members, plates or disks $d$ are herein termed "plates" or "disks" for brevity, and they are commonly known and designated by those skilled in the art as "disks". The word "disks" is herein used and intended to mean any form of inner plate, disk, baffle or separator member inside of or forming a part of a cream separator bowl and adapted to operate upon material to be treated in a cream separator or centrifugal separator bowl or drum. These dished separator members, plates or disks are each concave or hollow on one side and convex or provided with a projecting or protruding inner side face on the opposite and preferably bottom side. In other words, the disks are preferably concavo-convex or in the shape of truncated cones, and are loosely mounted in the bowl shell one above the other with their inner conical surfaces or concave sides all facing in the same direction preferably upward, and their outer conical surfaces or convex sides all facing preferably in the opposite direction or downward. The hollow or concave side of each disk is thus adjacent to and partially encircles the convex or projecting side of the next adjacent disk, so that the entire series of disks forms a flexible column of disks inside of the bowl shell. Each disk is provided with a central perforation $e$, of greater diameter than the hollow shaft 2, and adapted to permit the disks or dished separator members to move transversely and to rotate or move circumferentially to a sufficient extent to enable the bowl to be automatically balanced. Each disk has preferably a plurality or series of radial notches $f$ opening into the central perforation and is provided with rims or flanges $g$ which extend around the edges of the said notches and are formed by folding back the edge portion of the disk in which the notches are formed.

The inner peripheral edge portions or perimeters $h$ of each disk between said radial inner notches are of a single thickness of the sheet metal of which the disks are formed. Each disk is also provided with a plurality of outer apertures or notches $i$ in its outer edge, adjacent to the inner face of the bowl shell, and with a plurality of perforations $j$ formed by folding back a lap or fold of the body of the disk cut partially away to form supporting studs or bosses which are directly over one another. The bosses $k$ adjacent to each series of perforations $j$ thus form, with the disks, of which they are a part, a flexible column, and are each in sliding engagement with the next adjacent disk. The flanges or rims $g$ adjacent to each series of notches $f$ form outer wall portions of passages corresponding with the notches $f$ which register, and which passages extend through the entire series of disks, as does, also the central passage formed by the central perforations $e$. Each series of outer perforations, slots or apertures $i$ also forms an outer or peripheral passage from the bottom to the top of the series of disks. The studs or bosses $k$, being of suitable thickness serve to support the disks at the desired distance apart so as to provide spaces $l$ between the adjacent concave and convex or conical surfaces of the disks adapted to permit and cause the heavier liquid or particles to flow outward from the axial or inner passage formed by the perforations $e$, and upward outside of the peripheries of the disks to and through the milk outlet hereinafter described, the lighter particles or cream and butter fat being caused to flow inward between the disks and downward and out through the cream outlet $m$ at the bottom of the bowl and series of disks. The wall portions of the milk inlet passages formed by the notches $f$ and rims $g$ prevent the incoming milk contained in said passages from flowing directly out laterally between the disks until it passes down to or near the bottom of the series of disks, so that all of the milk which is not separated from the cream during the downward movement is caused to pass outward and upward past substantially all of the disks and is thoroughly treated or separated by the time it reaches the top of the disks. The inward and downward flow of the cream or lighter particles between the disks and in the central passage formed by the perforations $e$ is thus encouraged and left unobstructed to as great an extent as possible.

A bowl cap or cover $n$ is mounted upon the main body portion of the bowl shell and forms a part of the bowl or skimming or centrifugal separator mechanism, being provided with radial depending ribs or wall portions $o$ which are preferably slightly curved and extend at an oblique angle to the central portion of the cover from the outer peripheral depending flange $r$ thereof. Between the ribs $o$ are thus formed outlet passages $p$ through which the skimmed milk or heavier liquid or material passes inward or toward the center of the bowl and out through the milk outlet or outlets $q$, as indicated in Fig. 1. The bowl cap or cover is provided with a main central or axial opening $s$ inclosed by an upwardly projecting annular wall portion $t$ and into which the milk outlets empty, the skimmed milk flowing out over the upper edge of said annular wall portion into the skimmed-milk cover $u$ and from thence through the skimmed milk discharge spout $v$. A cream receptacle, casing or cover $w$ encircles the lower portion of the bowl and incloses the cream outlets $m$ already described, which communicate with the interior of said cream cover or receptacle. A centrally perforated and arched bottom $y$ forms an annular passage for conducting the cream received from the bowl to the outlet spout $z$. The cream outlets being below the milk outlet and leading from the bottom of the bowl, it will be readily seen that the bowl is adapted to be drained thoroughly while in operative position. The bowl cap or cover is provided with a preferably integral central tube, shaft or socket 2 having its axial bore closed by a plug 3. The portion of the axial bore or opening 4 which is above this plug forms the main inlet for whole milk and is provided with branch passages 5, one of which is directly adjacent to each accelerator blade 6, when desired, and on the inside of a sediment trap or chamber 7 formed preferably above the disks and on the inside of the bowl.

The accelerator blades 6 extend radially from the sides of the hollow shaft and longitudinally of the shaft, and preferably through the entire series of disks, through the notches $f$, and with their outer lateral edges out of engagement with the disks, so as to permit the disks to move laterally, and, to a limited extent, circumferentially, said lateral movement of the disks being limited positively with respect to the bowl shell by the engagement of a circular wall portion of the bowl shell with the perimeters or circular edges of the disks. The circular wall portion of the bowl or bowl shell which engages the edges of the disks should be concentric with the axial center of the bowl, and should preferably engage the outer perimeters or peripheral edges of the disks rather than the inner perimeters or edges. I prefer that the edges thus engaged shall be the top edges of the respective disks, and that the top edges shall be the outer peripheral edges.

The sediment chamber or trap may be formed of a top plate or cover 8 and a bottom or cup portion 9, both of which are centrally perforated and so fitted together as to retain the sediment which is heavier than the liquid to be treated, at the outer margin of the chamber, and cause the liquid to flow into the central passages or openings formed by the disks. The top plate 8 is preferably secured to the bowl cap or cover, and a nut 10 is mounted in threaded engagement with the tube or shaft 2 and in engagement with the bottom of the bowl, so that by tightening the nut the cover and the interior members of the bowl mechanism engaged by the bowl cap are held in proper position, and the disks are also held in proper position but sufficiently loose to allow the desired movement or adjustment with relation to the bowl shell. The bottom disk rests at its outer peripheral edge, upon the bowl shell, and the balance of the series of disks are supported by said lower disk and rest slidably in engagement with each other, the top disk being loosely engaged by the bottom member 9 of the sediment receptacle, and both the inner and outer peripheral edges or perimeters of preferably all of the disks being entirely detached and free to be adjusted or moved by the action of centrifugal force generated by rotating them while in movable relation to the bowl shell. And the bowl shell, although detached or movable with relation to the disks has its inner surface preferably cylindrical and sufficiently near to the peripheries of the disks to limit their outward movement resulting from the application of centrifugal force, or from the rotation of the parts.

In Figs. 2 and 8 the point 11 indicates the point of gravity of the bowl shell as distinct from the center of gravity of the bowl as a whole. The point 12 indicates the geometrical center of the centrifugal separator or rotary bowl having the separator or disk members on the inside thereof. The point 13 indicates the geometrical center of the disk shown. In Fig. 2 the outer receptacle or bowl shell and the disks are indicated in full lines in positions corresponding with the points or centers above referred to, and said figure may be considered as representing the positions of the parts when the separator or bowl is out of balance.

In Fig. 2, broken lines 14 and 15 indicate the movability of the disks and illustrate the positions to which the two disks shown in full lines in said figure are adapted to be moved.

The series of disks or inner bowl members and the rotary receptacle in which they are contained are sustained and rotated in movable relation to each other and to the axis of rotation, and upon an axis of rotation which is, itself, shifting, movable or gyratory. And the individual outward pressure and tendencies of each and all of said relatively movable members or elements, all of which are adapted to operate upon the liquid or material to be treated, are utilized to counteract those of the others during such rotation of all of said parts. By this method of balancing, the axis of rotation and the center of gravity of the centrifugal separator, including the outer rotary receptacle, the inner bowl members or disks, and the material contained in or passing through said separator as well as the separator parts, are caused to coincide with each other and with the geometrical center of the outer receptacle or bowl shell. The bowl is thus balanced and adapted to come back to balanced position whenever thrown out of balance during the operation of the device, either as a result of inequalities in weight of the particles of material or from any other cause, all without the use of a counterbalance or weight, or any balancing device distinct from or in addition to the parts of the separator which are required to perform their functions in connection with the separation of the material treated or which actually operate upon said material to separate the lighter from the heavier particles or portions thereof.

In Figs. 7 and 8 the relatively movable members of a centrifugal separator or bowl, including a series of disks with parts omitted, for clearness, and a rotary receptacle in which said disks are contained in movable relation to each other and to the receptacle or bowl shell, are shown in balanced position, the disks being in engagement with different parts of the bowl shell on opposite sides of and above and below the center of gravity of all of said parts taken together, and said Figs. 7 and 8 may be considered as illustrating a separator or its parts brought to balanced position by the method above described. When the bowl is out of balance, the geometrical center of the bowl shell, which is indicated by the reference numeral 12 does not coincide with the axis of rotation of the bowl and the bowl shell is not concentric with the axis of rotation, but when the bowl is in balance, as indicated in Figs. 7 and 8, the geometrical center of the bowl shell or receptacle coincides with the axis of rotation of the bowl, and the inner peripheral walls of the bowl shell are therefore concentric with the axis of rotation. The bowl is therefore not only balanced, but is balanced in such a way that the bowl shell is concentric with the axis of rotation, and the geometrical center of the bowl shell, the axis of rotation, and the center of gravity of the bowl, all coincide. The inner cylindrical wall of the bowl shell is thus adapted to positively limit the outward movements of the disks and prevent them from tilting with respect to the axis of rotation to unbalanced position or to an inclined position which would tend to unbalance the bowl.

The superposed and relatively movable disks are encircled by and inclosed within the bowl shell in laterally movable relation thereto, and are so sustained and rotated, with their outer or peripheral edges in contact with the bowl shell at such points as their outward movements, or the action of centrifugal force causes the receptacle and disks to engage and resist the outward tendencies of each other.

It will be noted that the disks extend in every direction around or beyond the geometrical center and the center of weight or gravity of the device or disks and bowl to be balanced, and that they are adapted to move outward or at their peripheries into contact with the bowl shell at a multiplicity of points above, below and on all sides of the center of the bowl or device to be balanced.

I prefer the form and arrangement of parts—particularly the disks and bowl shell, and inlets and outlets—illustrated in the drawings, and of these the preferred form is shown in Figs. 1, 2, and 3, 7, 8, and 9. It will be understood however that with modification and substitution of mechanical equivalents my invention is capable of being used in various modified forms of devices without departing from the spirit of the invention. And I do not limit myself to the specific form or construction or arrangement of elements shown except as set forth in the claims, but contemplate such modifications and substitutions of mechanical equivalents as would occur to any one skilled in the art, in connection with the construction and mode of operation of devices embodying this invention.

The disks should preferably extend downward and inward at an incline rather than downward and outward. And I prefer to operate the machine without fixing the disks with relation to the bowl, after they have been moved to proper balanced position in the manner above described. The degree of rigidity or flexibility of the connection between the member 8, which forms the sediment chamber cover, and the depending tubular portion of the bowl cap may be made greater or less as required, and as the outer edge or peripheral portion of the element 8 is in contact with the top disk, and the element 9 is also in contact with the disk above the bosses $k$, and elsewhere, if desired, it will be seen that by tightening the nut 10 any desired degree of rigidity or fixedness between the disks and bowl shell might be obtained, but I consider any degree of rigidity which will not permit constant freedom of movement of the disks with relation to each other and with relation to the receptacle to be both undesirable and detrimental, as the proper balancing of the device depends upon the movability of the disks, as suggested. The bowl cap or cover is provided with a yielding or compressible packing 116 between the inner face of the bowl shell and the depending annular flange of the cover, which makes a tight joint and yet permits a limited downward movement of the bowl cap or cover after the shell is tightly closed to an extent which will prevent leakage.

I provide a yielding or flexible bearing for the spindle comprising a laterally movable bearing ring or journal 16 which is slidably mounted upon a fixed supporting member 17, which in turn rests upon a hollow main frame 18. The frame 18 is supported preferably by a base plate or fixed support 19 with which the upper frame or main frame is connected by means of a pivot or hinge 20, on one side, and a pivoted bolt 21 and thumb nut 22 in threaded engagement with said bolt, on the opposite side. The bolt 21 is connected with the base plate by means of a pivot 23, and extends into a suitable aperture in a laterally projecting lug or arm 24, on the main frame 18. The bolt and nut are thus adapted to be turned into and out of securing engagement with the arm portion 24 of the upper pivoted or main frame, and the latter is adapted to be swung from upright operative position upon the pivot 20, to inclined or horizontal position when desired.

The spindle $c$ is provided with a bottom or supporting bearing mounted in the pivoted main frame and consisting of a bearing ring or journal 25 mounted in a perforated inwardly extending portion 26′ of the frame 18, a threaded plug 26 provided with a metallic supporting point or bearing pin 27, and a pin or ball 28 formed preferably of tempered steel and interposed between the lower end of the spindle and the supporting pin or plug aforesaid. The supporting portion 26′ of the frame is provided with a perforation 29 which opens into the vertical bore in which the plug 27 and bearing ring 25 are mounted, and the plug and bearing ring are a sufficient distance apart to permit the free passage of a lubricant to the bearing. I prefer to keep the bearing thus formed constantly immersed in oil contained in the cup or chamber formed by the depressed central portion of the base plate 19 and the annular flange portion 30 of said base plate. The upper surface of the oil is indicated by the line 31 which is above the level of the supporting bearing of the spindle. A centering ring 32 encircles the laterally movable bearing ring 16 already described, and engages said bearing ring and the fixed member 17. This centering ring is yieldingly supported upon a spring 33, which is in turn supported at its lower end by a nut 34 which is in threaded engagement with and forms an adjustable part of the laterally movable journal or bearing member 16. The desired laterally yielding resistance to the gyrations or lateral movements of the revolving spindle is thus afforded.

The spindle is provided with a worm 35 which is in threaded engagement with a worm wheel 36 which is mounted upon a driving shaft 37 to which it is fixed in any ordinary and well known manner. The driving shaft is journaled in the pivoted or upper main frame 18 of the machine, and is adapted to be connected with a suitable source of power by any desired or suitable known means. An additional or main driving shaft 38 is mounted in the frame 18 and suitably connected with the worm wheel shaft 37 by means of suitable speed reducing gears or sprocket and chain mechanism comprising gears mounted upon the shafts 37 and 38 respectively and operatively connected with one or the other of said shafts by suitable clutch mechanism. The shaft 38 may be provided with a crank or pulley or other desired or known means for connecting it with a source of power or for enabling the bowl and disks to be rotated manually. As the connecting gears between the shaft 37 and the shaft 38 or any desired source of power constitute known elements it is not deemed necessary to illustrate or describe them here, and they are omitted.

The lower edge of the worm wheel 36 is kept constantly immersed in oil, while in operation, and an oil cup 39 is mounted over the worm wheel and inside of the gear containing chamber 40 and above the level of the flexible bearing. An oil tube 41 leads downward from the oil cup 39 and outside of the chamber 40 to a point directly over the bearing ring or journal 16 of the flexible bearing which yieldingly holds the spindle in operative position. The bearing ring has an upper annular flange forming a cup-like receptacle for oil, which is adapted to cause the oil to flow toward the center of the bearing. The oil tube is held in position by removable plate 42 which is secured to the frame of the machine, and a baffle plate or shield 43 serves to receive the oil thrown up by the revolving worm wheel and conduct it into the oil cup 39 from which it flows to the flexible bearing and back to the worm wheel or main oil reservoir, to be used over and over again. The bearings of the shaft 38 are also kept constantly lubricated by oil thrown up onto said shaft by the revolving worm wheel.

The oil cup or receptacle 39 and its outlet tube 41 are adapted to be readily removed from the oil containing chamber or casing. The worm wheel 36 has its lower edge constantly immersed in oil. All of the journal bearings of the machine are oiled by a single source of oil supply contained in the casing or frame of the machine, the worm 36 carrying up oil for all bearings but the spindle support.

An oil trap, adapted to cause all liquid heavier than oil to pass out from the oil containing or gear chamber 40 is provided in the form of a drain pipe 44 leading down from the bottom of the oil reservoir and having its upper end inside of the oil reservoir and below the surface of the oil, and a tube 45 open at top and bottom encircling said drain pipe and extending above the surface of the oil. The bottom of this tube is provided with openings 46 at the bottom of reservoir and below the level of the top of the drain pipe, and is of sufficient diameter to permit the flow of liquid upward inside the tube and over the top of and out through the drain pipe. A shield 47 is mounted on a plate 48 and covers the top of the tube 45 so as to prevent oil from finding its way into said tube from the top.

A standard 49 is mounted in the upper portion of the frame 18, and with said frame forms a support for a bracket 50 and a ring or annular bracket 51, which encircles the bowl. The bracket 50 forms a support for the supply can or reservoir 52, and the ring or bracket 51 forms a support for the skimmed milk cover or receptacle u, and for the float cup or whole milk feeding cup 53. The supply can is provided with a spigot or cock 54 having a valve 55 adapted to conduct whole milk from the supply can into the float cup at any desired rate of speed, the volume being controlled by the valve. A float 56 is mounted loosely in the float cup between the mouth of the cock or faucet and the milk inlet passage 57 which leads from the float cup to the bowl. This float is so proportioned that when the milk in the float cup rises to or beyond a given depth the float comes in contact with the mouth of the faucet, temporarily closing or partially closing it.

In Figs. 7, 8, and 9, are shown a modified form of hollow shaft having laterally extending, or radially extending V-shaped upright walls 58 which are encircled by the disks and are adjacent to the notched inner edge portions thereof forming V-shaped channels corresponding with the channels $f$ already described, and shown in Fig. 2—the walls which form the laterally closed portions of the channels in Fig. 2 consisting of the flanges $g$ on the disks, already described. The channels and the walls which form the channels in Fig. 2, have spaces between their inner edge portions. The upright walls, whether formed by the continuous hollow shaft or walls 58 or by the flanges $g$ are closed laterally or in the direction of the periphery of the disks; and the inner portions of said walls which form the inner edges of the channels are inside of the cream zone, said channels and walls being closed laterally outside of or beyond the cream zone, so as to prevent the flow of milk outward between the disks until the lightest particles of the cream have first been separated from the main body of the milk or material by passing down through preferably the entire series of disks in the channels or central passage above described. The cream outlet is below the level of the disks and adjacent to the inner lower portions of these channels, and the outer portions of the channels communicate with the spaces between the outer portions of the disks, and between the peripheries of the disks and the periphery of the outer receptacle, as already suggested, so that after passing through the channels in the direction of the cream outlet the remaining main body of the liquid from which the lightest particles of cream and butter fat have been separated is caused to pass outward and upward past the outer portions of all of the disks, or preferably all of them, and is subjected to the separating or skimming action of preferably the entire series of disks. In Figs. 7 and 9 is shown my preferred form of skimmed milk outlet, which consists of a screw 59 having an aperture therethrough in oblique relation to the axial center of the screw, so that by turning the screw the distance at which the outlet is located from the axial center of the receptacle may be changed and governed as desired, thus controlling the thickness of the cream.

The channels formed between the walls 58 of the hollow shaft communicate with the axial center of the shaft or elongated nut 10 through openings corresponding with openings 5 already described.

I claim:

1. In a cream separator, the combination of a rotary bowl shell a series of dished separator disks inside of and movable transversely with respect to the bowl shell, said series of disks and the bowl shell being in operative engagement and adapted to resist the outward movements of each other and operate upon the material to be treated, and means for rotating the bowl shell.

2. In a cream separator, the combination of a rotary bowl shell, a series of dished separator disks inside of and movable transversely with relation to the bowl shell, said bowl shell having a circular surface concentric with its geometrical center in engagement with and adapted to limit the outward movement of a plurality of said disks with respect to the bowl shell, and retain said disks in position to cause the bowl shell and disks to counterbalance each other and operate upon the material to be treated, and means for rotating the bowl shell and thereby the disks.

3. In a cream separator, the combination of a rotary bowl shell, a series of detached relatively movable separator disks inside of and movable with respect to the bowl shell, said bowl shell being in engagement with the outer peripheral edge of each disk, and said series of disks and the bowl shell being adapted to counteract and limit the outward movements of each other with respect to the axis of rotation and cause the bowl shell to be held in balanced position concentric with its axis of rotation, means for supporting the bowl shell, and means for rotating the bowl shell and thereby the disks.

4. In a cream separator, the combination of a rotary bowl shell, a series of separator disks loosely fitted inside of and movable with respect to the bowl shell, said bowl shell having a circular inner peripheral surface encircling and in engagement with the outer peripheral edge of each disk and adapted to limit the outward movements of said disks with respect to the bowl shell, means for limiting the tilting of the disks with respect to the axis of rotation of the bowl, and means for rotating the bowl shell and thereby the disks.

5. In a cream separator, the combination of a rotary bowl shell, a series of detached annular disks loosely lying on top of and in supporting engagement with one another inside of and movable with respect to the bowl shell, said bowl shell having a circular inner surface encircling and in contact with the outer peripheral edge of each disk and adapted to positively limit the outward movement of the disks with respect to the bowl shell, and means for rotating the bowl shell and thereby the disks, for the purpose of balancing the bowl.

6. In a cream separator, the combination of a rotary bowl shell, a plurality of separator disks inside of and movable with respect to the bowl shell and each having an annular peripheral portion in a plane substantially perpendicular with the axis of rotation of the bowl, said bowl shell having an inner concentric cylindrical surface in engagement with said annular peripheral portion of each of said disks adapted to positively limit the outward movements of the disks with respect to the bowl shell and limit the tilting of the disks with respect to a plane substantially perpendicular to the axis of rotation of the bowl shell, and means for rotating the bowl shell and thereby the disks.

7. In a cream separator, the combination of a rotary bowl shell, a plurality of detached truncated-cone-shaped separator disks inside of and movable with respect to the bowl shell, each having an annular peripheral portion in engagement with a circular surface which is concentric and in fixed relation to the bowl shell, said bowl shell and disks being adapted to counteract and limit the outward movements of one another and thereby cause the bowl shell to be brought into and sustained in balanced position concentric with the axis of rotation of the bowl, an upright spindle on which the bowl shell is mounted, and means for rotating the bowl shell and thereby the disks.

8. In a cream separator, the combination of a rotary bowl shell, and a plurality of detached truncated-cone-shaped separator disks in contact and supporting engagement with one another and each having an annular peripheral portion in contact with a circular surface which is concentric and laterally immovable with respect to the geometrical center of the bowl shell, an upright spindle on which the bowl shell is mounted, bearings for the spindle, and means for rotating the spindle and bowl shell and thereby the disks, said disks and bowl shell being adapted to operate upon the material to be treated and counteract and limit the outward movements of one another and bring the bowl shell into balanced position with its inner peripheral surface concentric with the axis of rotation of the bowl.

9. In a cream separator, the combination of a rotary bowl shell, a plurality of annular separator disks inside of and movable with respect to the bowl shell and each in a plane substantially perpendicular to the axis of rotation of the bowl shell, said bowl shell having a cylindrical inner peripheral surface in engagement with the peripheral edge of each of said disks adapted to positively limit the outward movement of the disks with respect to the bowl shell, means for preventing the tilting of the disks respectively from a position in which each is in a plane substantially perpendicular to the axis of rotation of the bowl shell, a hollow shaft inside of the bowl shell in fixed relation to the latter and extending through and out of contact with the disks, and means for rotating the bowl shell and thereby the disks, whereby the bowl shell is brought into and retained in balanced position with its cylindrical inner surface concentric to the axis of rotation of the bowl.

10. In a cream separator, the combination of a rotary bowl shell, a plurality of detached separator disks superposed and in supporting engagement with each other, the outer peripheral edge of each disk being in engagement with the inner peripheral wall of the bowl shell and movable with respect to the bowl shell and the other disks, and means for preventing the tilting of the disks with respect to the axial center of rotation of the bowl.

11. In a cream separator, the combination of a rotary bowl shell, an upright spindle on which the bowl shell is mounted, a plurality of separator disks loosely fitted in and movable with respect to the bowl shell and each engaging the bowl shell, an inner casing member inside of the bowl shell in engagement with the top disk on different sides of its axial center, and means for rotating the bowl shell and thereby the disks.

12. In a cream separator, the combination of a rotary bowl shell, a plurality of relatively movable separator disks inside of and movable laterally with respect to the bowl shell and in supporting engagement with one another, each of said disks having a peripheral portion in engagement with the bowl shell, and an inner casing member in engagement with the top disk adapted to prevent the tilting of the disks with respect to the axis of rotation.

13. In a machine of the class described, the combination of a rotary bowl shell, a plurality of relatively movable superposed separator disks each in contact with and movable with respect to the bowl shell, a hollow core extending through the disks in fixed relation to the bowl shell and adapted to permit the free movement of each of the disks radially in any direction into contact with the bowl shell without coming in contact with said hollow core, and an inner casing in engagement with the top disk on different sides of its axial center adapted to form a sediment chamber and prevent the tilting of the disks with respect to the axis of rotation of the bowl.

14. In a cream separator, the combination of a rotary separator bowl shell having inlet and outlet openings and provided with a cylindrical inner peripheral wall, a central hollow shaft in fixed relation to the bowl shell, a series of superposed truncated-cone shaped disks loosely engaging the inner peripheral wall of the bowl shell and each out of contact with and freely movable with respect to the hollow shaft, and accelerator blades extending radially from different sides of the hollow shaft and through the disks and adapted to permit each of the disks to move freely radially with respect to the hollow shaft and accelerator blades into contact with the bowl shell and without coming into contact with the hollow shaft, whereby the radial movement of each disk is limited wholly by the bowl shell.

15. In a cream separator, the combination of a rotary bowl shell, a series of truncated-cone shaped separator disks loosely arranged inside of and in movable relation to the bowl shell and each in contact with the bowl shell, said series of disks and the bowl shell being adapted to limit the radial movements of each other with respect to the axis of rotation of the bowl shell, a spindle on which the bowl shell is mounted, a supporting frame provided with a bottom bearing in supporting engagement with the bottom of the spindle, a flexible bearing supported by said frame and in engagement with the spindle between the bowl shell and the bottom end of the spindle, and means for rotating the spindle and thereby the bowl shell and disks.

16. In a cream separator, the combination of a rotary bowl shell having inlet and outlet openings, and a series of truncated-cone shaped disks the sides of which extend downward and inward at an incline toward the center of the bowl shell, said disks being of less diameter than the inner wall of the bowl shell and movable with relation thereto.

17. In a cream separator, the combination of a rotary bowl shell forming a chamber provided with inlet and outlet openings, and a series of annular disks having truncated-cone shaped portions extending at an angle with relation to the axial center of the bowl shell, said disks being of smaller diameter than the chamber in which they are mounted and being movable with relation to the bowl shell and in sliding engagement with each other.

18. In a cream separator, the combination of a rotary bowl shell forming a chamber provided with inlet and outlet openings, and a series of annular disks having truncated-cone shaped portions extending at an angle with relation to the axial center of the bowl shell, each of said disks being of less diameter than the portion of the chamber adjacent to its periphery and being movable with relation to and in contact with the peripheral wall of the bowl shell, and having spaces between the disks for permitting the passage of material to be operated upon, an upright spindle upon which the bowl is mounted, a bottom bearing in engagement with the spindle, a flexible bearing in engagement with the spindle below the bowl, and gear mechanism in engagement with the spindle below the flexible bearing, for rotating the spindle and bowl shell and thereby the contents of the bowl shell.

19. In a cream separator, the combination of a rotary receptacle, a hollow core extending in upright position through the central portion of the receptacle, and a series of truncated-cone shaped disks encircling said hollow core and each provided with a central opening the inner edges of which are in movable relation to and out of contact with the hollow core, and having their outer peripheral edges in engagement with and movable with relation to the circular peripheral walls of the receptacle.

20. In a cream separator, the combination of a rotary receptacle having milk inlet, and cream outlet and milk outlet openings, a series of centrally perforated truncated-cone shaped disks mounted in said receptacle and having spaces between the adjacent conical side portions of said disks, and angular walls extending across the spaces between the disks adjacent to the inner edges thereof and forming channels, the inner portions of said walls being inside of a central zone containing cream and the outer portions of said walls being outside of the cream containing central zone or space and forming outwardly closed walls for said channels adapted to entirely close the channels on the outside of the cream containing space and in the direction of the peripheries of the disks.

21. In a cream separator, the combination of a rotary bowl, a series of dished separator members inside of and movable transversely with respect to the bowl, the edges of a plurality of said disks being adapted to engage the bowl, means for supporting the bowl, and means for permitting and yieldingly resisting the transverse movements of the bowl.

22. In a cream separator, the combination of a rotary bowl having inlet and outlet openings, a series of liner plates inside of and movable transversely with respect to the bowl and adapted to operate upon the material to be treated, the edges of a plurality of said liner plates being adapted to engage a circular surface portion of the bowl, means for rotatably supporting the bowl, means for permitting and yieldingly resisting the movement of the bowl transversely with respect to its axial center, and means for rotating the bowl.

23. In a cream separator the combination of a rotary bowl having inlet and outlet openings, a series of liner plates inside of and movable transversely with respect to the bowl and having edges adapted to engage a circular surface portion of the bowl, a spindle on which the bowl is mounted, and a yielding bearing in engagement with the spindle and adapted to permit and yieldingly resist the movement of the bowl transversely with respect to its axial center.

24. In a cream separator, the combination of a bowl having a circular surface portion concentric with its geometrical center, a series of liner plates inside of and movable transversely with respect to and having their edges adapted to engage said concentric surface portion of the bowl, and a yielding bearing operatively connected with the bowl.

25. In a cream separator, the combination of a bowl having a circular surface portion concentric with its geometrical center a series of dished liner plates inside of and movable transversely with respect to the bowl, the edges of a plurality of said liner plates being adapted to engage said circular surface of the bowl, a spindle upon which the bowl is mounted, a yielding bearing for the spindle, and means for rotating the bowl.

26. In a cream separator, the combination of a rotary bowl having inlet and outlet openings, a series of liner plates inside of and movable transversely and circumferentially with respect to the bowl and adapted to operate upon the material to be treated, the edges of a plurality of said liner plates being adapted to engage a circular surface portion of the bowl, means for supporting the bowl, a yielding bearing operatively connected with the bowl, and means for rotating the bowl.

27. In a cream separator, the combination with a rotatable drum, of a series of superposed and spaced plates, said plates being supported within and in engagement with the drum and movable laterally within the latter, and of such construction that the center of gravity of the plates is maintained eccentric to the drum axis during the rotation of the latter.

28. In a cream separator, the combination with a rotatable drum, of a series of superposed and spaced separator plates, supported and movable laterally within the drum, and so constructed that the center of gravity of each of the plates is maintained eccentric to the drum axis during the rotation of the latter, the drum being in engagement with and adapted to limit the lateral movement of the plates.

SEVERIN C. ANKER-HOLTH.

Witnesses:
HARRY I. CROMER,
RUFUS COPE.